(12) United States Patent
Lin et al.

(10) Patent No.: US 9,207,788 B2
(45) Date of Patent: Dec. 8, 2015

(54) DECORATIVE FILM ON TRANSPARENT SUBSTRATE, A TOUCH SENSOR DEVICE AND METHOD OF MANUFACTURING THE SAME

(75) Inventors: Su Peng Lin, Miao-Li County (TW); Tsu-Hsien Ku, Miao-Li County (TW); Jyh-Douh Tu, Miao-Li County (TW); Szu-Wei Lai, Miao-Li County (TW)

(73) Assignees: INNOCOM TECHNOLOGY(SHENZHEN) CO., LTD., Longhua Town, Shenzhen (CN); INNOLUX CORPORATION, Miao-Li County (TW)

( * ) Notice: Subject to any disclaimer, the term of this patent is extended or adjusted under 35 U.S.C. 154(b) by 376 days.

(21) Appl. No.: 13/564,299

(22) Filed: Aug. 1, 2012

(65) Prior Publication Data
US 2013/0038547 A1    Feb. 14, 2013

(30) Foreign Application Priority Data
Aug. 9, 2011    (TW) .............................. 100128303 A

(51) Int. Cl.
*G06F 3/041* (2006.01)
*H04M 1/02* (2006.01)

(52) U.S. Cl.
CPC .............. *G06F 3/041* (2013.01); *H04M 1/0266* (2013.01); *H04M 2250/22* (2013.01)

(58) Field of Classification Search
CPC ......... G06F 3/041; G06F 3/042; H05K 13/00; G02B 5/08
See application file for complete search history.

(56) References Cited

U.S. PATENT DOCUMENTS

| | | | |
|---|---|---|---|
| 2010/0209594 A1* | 8/2010 | Curtis et al. | 427/74 |
| 2010/0302206 A1* | 12/2010 | Yu et al. | 345/174 |
| 2011/0242057 A1* | 10/2011 | Lee et al. | 345/176 |
| 2012/0085965 A1* | 4/2012 | Doll et al. | 252/79.3 |
| 2013/0306460 A1 | 11/2013 | Teramoto | |

FOREIGN PATENT DOCUMENTS

| | | |
|---|---|---|
| CN | 101639580 | 2/2010 |
| CN | 101920586 | 12/2010 |
| CN | 101920586 A | 12/2010 |
| TW | 558525 | 10/2003 |

OTHER PUBLICATIONS

Taiwanese language office action dated Jul. 3, 2014.
English language translation of abstract of TW 558525 (published Oct. 21, 2003).
Chinese language office action dated Dec. 22, 2014.
English language translation of abstract of CN 101639580 (published Feb. 3, 2010).
English language translation of abstract of CN 101920586 (published Dec. 22, 2010).
CN Office Action dated Aug. 27, 2015 in corresponding Chinese application (No. 201110227176.7).

* cited by examiner

*Primary Examiner* — Tony N Ngo
(74) *Attorney, Agent, or Firm* — McClure, Qualey & Rodack, LLP

(57) ABSTRACT

A decorative film on a transparent substrate is provided. The decorative film includes a color transparent layer, a reflective layer and a protective layer. The color transparent layer is on a surface of a transparent substrate. The reflective layer is disposed on the color transparent layer and the protective layer is disposed on the reflective layer. The disclosure also describes a touch sensor device and a method of manufacturing a touch sensor device.

26 Claims, 5 Drawing Sheets

US 9,207,788 B2

DECORATIVE FILM ON TRANSPARENT SUBSTRATE, A TOUCH SENSOR DEVICE AND METHOD OF MANUFACTURING THE SAME

This Application claims priority of Taiwan Patent Application No. 100128303, filed on Aug. 9, 2011, the entirety of which is incorporated by reference herein.

BACKGROUND OF THE INVENTION

1. Field of the Invention

The disclosure relates to a decorative technology for electronic products, and in particular to a decorative film for a touch sensor device.

2. Description of the Related Art

For various electronic products having touch sensor devices, such as notebook computers, personal digital assistants (PDAs), electronic books, projectors and mobile phones, the design of the appearance of the electronic products typically affect popularity thereof for consumers. Therefore, typically, decorative films are adopted by the various electronic products, thereby increasing added value thereof.

Currently, a conventional color ink or metallic printing ink is used for formation of the decorative films, in which the metallic printing ink (e.g., gold printing ink containing copper or zinc particles or silver printing ink containing aluminum particles) employs fine metallic particles to replace the dye or pigment in conventional color inks, such that the decorative film has a metallic gloss. The metallic gloss of the metallic printing ink is relative to the size of the metallic particles therein. Since the reflective ability of larger metallic particles is better than that of smaller ones, the metallic gloss can be increased by increasing the size of the metallic particles in the metallic printing ink. For screen printing processes, however, if the size of the metallic particles is too large, it is difficult for ink to be transferred. If the size of a screen mesh is increased, it may induce printing quality problems. That is, screen printing using metallic printing ink is limited to sizes of the metallic particles in the metallic printing ink. Additionally, since metallic printing ink is more expensive than the conventional color ink, it is not applied to decorative films with a large area due to high manufacturing costs.

Accordingly, there exists a need in the art for development of a novel decorative film structure, which is capable of mitigating or eliminating the deficiencies mentioned above.

BRIEF SUMMARY OF THE INVENTION

A detailed description is given in the following embodiments with reference to the accompanying drawings. An exemplary embodiment of a decorative film on a transparent substrate comprises a color transparent layer on a surface of a transparent substrate. A reflective layer is disposed on the color transparent layer and a protective layer is disposed on the reflective layer.

An exemplary embodiment of a touch sensor device. The touch sensor device comprises a transparent substrate having a sensing region and a non-sensing region and having a first surface and a second surface opposite thereto. A sensing layer is on the first surface of the transparent substrate and corresponds to the sensing region. A color transparent layer is on the first surface of the transparent substrate and corresponds to the non-sensing region. A reflective layer is disposed on and covers the color transparent layer. A protective layer is disposed on the color transparent layer and covers the reflective layer.

An exemplary embodiment of a method of manufacturing a touch sensor device comprises providing a transparent substrate having a sensing region and a non-sensing region and having a first surface and a second surface opposite thereto. A sensing electrode array is formed on the first surface of the transparent substrate, wherein the sensing electrode array corresponds to the sensing region. A color transparent layer is formed on the first surface of the transparent substrate, wherein the color transparent layer corresponds to the non-sensing region. A reflective layer is formed on the color transparent layer.

BRIEF DESCRIPTION OF DRAWINGS

The disclosure can be more fully understood by reading the subsequent detailed description and examples with references made to the accompanying drawings, wherein.

DETAILED DESCRIPTION OF DISCLOSURE

Figure 1A:
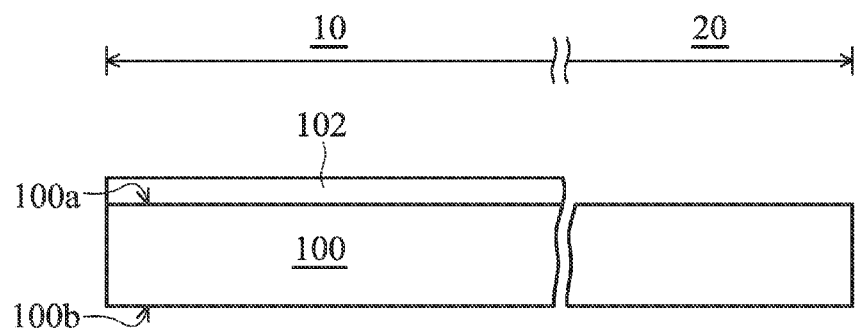
FIGS. 1A to 1D are cross section views of an exemplary embodiment of a method of manufacturing a system for displaying images having a touch sensor device according to the disclosure.

The following description is of the best-contemplated mode of carrying out the disclosure. This description is provided for the purpose of illustrating the general principles of the disclosure and should not be taken in a limiting sense. The scope of the disclosure is best determined by reference to the appended claims.

Systems for displaying images are provided. FIG. 1D illustrates a plan view of an exemplary embodiment of a system for displaying images including a touch sensor device 200 according to the disclosure. In the embodiment, the touch sensor device 200 comprises a transparent substrate 100, a color transparent layer 105, a reflective layer 107, a first protective layer 109 and a sensing layer 120 (which includes a sensing electrode array 102, an isolation layer 104, a wiring layer 106 and a second protective layer 108). In one embodiment, the transparent substrate 100 may be composed of glass to serve as a sensing glass and a cover glass. In another embodiment, the transparent substrate 100 may comprise quartz or plastic or non-plastic polymer transparent materials. In the embodiment, the transparent substrate 100 has a sensing region 10 and a non-sensing region 20. Typically, the sensing region 10 is at a central region of the transparent substrate 100 and the non-sensing region 20 is at a peripheral region of the transparent substrate 100 and encloses the sensing region 10. Moreover, the transparent substrate 100 has a first surface 100a and a second surface 100b opposite to the first surface 100a. In the embodiment, the first surface 100a may be a non-viewed surface and the second surface 100b is a viewed surface. A black matrix (BM) pattern layer (not shown) is typically disposed on the first surface 100a of the transparent substrate 100 and corresponds to the sensing region 10 and the non-sensing region 20, in which the BM pattern layer corresponding to the sensing region 10 is used for formation of a light shielding region, and the BM pattern layer corresponding to the non-sensing region 20 is used for formation of decorative patterns.

The sensing layer 120 is disposed on the first surface 100*a* of the transparent substrate 100 and corresponds to the sensing region 10. The sensing electrode array 102 of the sensing layer 120 is disposed on the first surface 100*a* of the transparent substrate 100 and corresponds to the sensing region 10. The sensing electrode array 102 may be composed of a transparent and conductive pattern layer, such as an indium tin oxide (ITO) or indium zinc oxide (IZO) layer, and comprise two groups of sensing electrodes arranged in an array. Here, in order to simplify the diagram, only a flat layer is depicted.

The isolation layer 104 of the sensing layer 120 is disposed on the first surface 100*a* of the transparent substrate 100 and corresponds to the sensing region 10, such that the sensing electrode array 102 is interposed between the transparent substrate 100 and the isolation layer 104. In the embodiment, the isolation layer 104 may comprise a dielectric material and be a single layer (e.g., a silicon oxide layer, a silicon nitride layer or other transparent polymer layer) or a multi-layered structure (e.g., a stack of silicon oxide, silicon nitride, or other transparent polymer or a combination thereof).

The wiring layer 106 of the sensing layer 120 is disposed on the isolation layer 104 in the sensing region 10 and is electrically connected to the sensing electrode array 102 under the isolation layer 104 (not shown). The wiring layer 106 may be a single metal (e.g., aluminum, chromium, tin, zirconium or an alloy thereof or a combination thereof) layer or a multi-layered structure (e.g., a stack of aluminum, chromium, tin, zirconium or an alloy thereof or a combination thereof).

The color transparent layer 105 is disposed on the first surface 100*a* of the transparent substrate 100 and corresponds to the non-sensing region 20, thereby serving a first portion of a decorative film. In one embodiment, the color transparent layer 105 may comprise ink composed of a transparent resin and at least one staining agent, wherein the staining agent has a percentage by weight in a range from 1% to 10%. In this case, the color transparent layer 105 may present a desired color by using various staining agents. In another embodiment, the color transparent layer 105 may comprise a dielectric material and be a single layer (e.g., a silicon oxide layer, a silicon nitride layer or other transparent polymer layer) or a multi-layered structure (e.g., a stack of silicon oxide, silicon nitride, or other transparent polymer or a combination thereof). For example, the color transparent layer 105 and the isolation layer 104 may comprise the same dielectric material. Moreover, the thickness of the color transparent layer 105 may be adjusted to a range from 20 nm to 90 nm. In this case, the color transparent layer 105 may present a desired color by varying the thickness of the color transparent layer 105.

The reflective layer 107 is disposed on the color transparent layer 105 in the non-sensing region 20 for serving as a second portion of the decorative film, such that the decorative film can present a metallic gloss. The reflective layer 107 has a thickness in a range from 15 nm to 100 nm. In one embodiment, the reflective layer 107 may be a single metal (e.g., aluminum, chromium, tin, zirconium or an alloy thereof or a combination thereof) layer or a multi-layered structure (e.g., a stack of aluminum, chromium, tin, zirconium or an alloy thereof or a combination thereof). For example, the reflective layer 107 and the wiring layer 106 may be composed of the same metal layer. In another embodiment, the wiring layer 106 is a metal layer and the reflective layer 107 may be a discontinuous phase of metal configured as a single layer or a multi-layered structure that comprises aluminum, chromium, tin, zirconium or an alloy thereof or a combination thereof.

The first protective layer 109 is disposed on the color transparent layer 105 in the non-sensing region 20 and covers the reflective layer 107 for serving as a third portion of the decorative film. The first protective layer 109 may comprise ink composed of a transparent resin and at least one staining agent and has a thickness in a range from 3 µm to 12 µm. In one embodiment, the first protective layer 109 may comprise ink including an organic resist material, an inorganic dielectric material or a transparent resin.

The second protective layer 108 of the sensing layer 120 is disposed on the isolation layer 104 in the sensing region 10 and covers the wiring layer 106. The second protective layer 108 may comprise an inorganic dielectric material and be a single layer (e.g., a silicon oxide layer, a silicon nitride layer or a silicon oxynitride layer) or a multi-layered structure (e.g., a stack of silicon oxide, silicon nitride, or silicon oxynitride or a combination thereof). In one embodiment, the second protective layer 108 may comprise an organic resist material.

In yet another embodiment, the first protective layer 109 may comprise an inorganic dielectric material and be a single layer (e.g., a silicon oxide layer, a silicon nitride layer or a silicon oxynitride layer) or a multi-layered structure (e.g., a stack of silicon oxide, silicon nitride, or silicon oxynitride or a combination thereof). For example, the second protective layer 108 and the first protective layer 109 may be comprised of the same inorganic dielectric material.

Figure 1B:
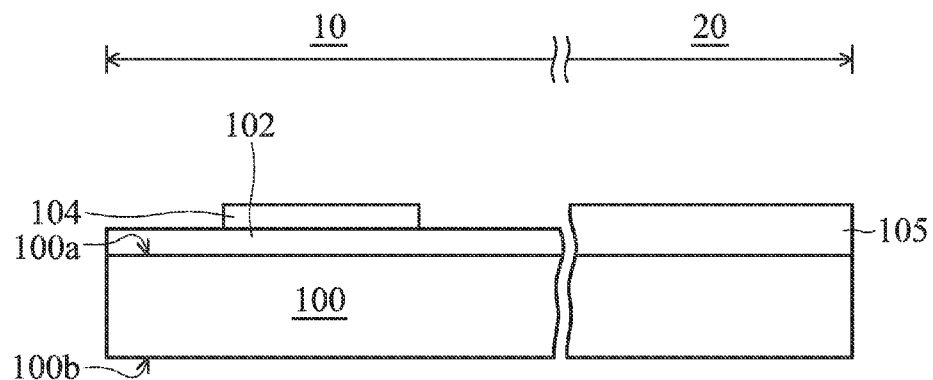
Figure 1C:
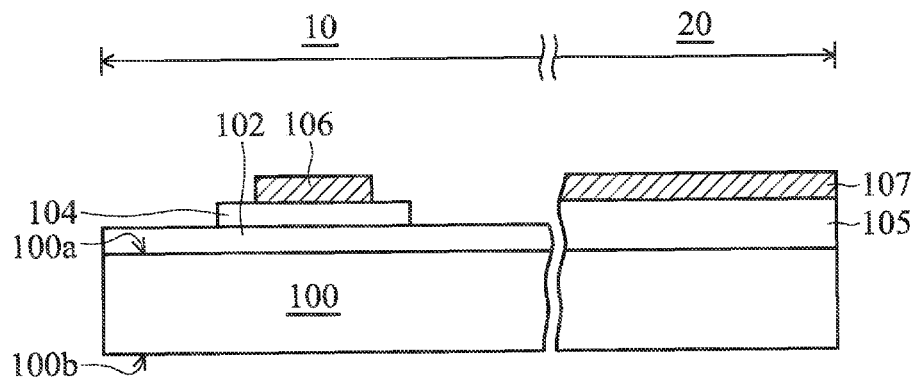
Figure 1D:
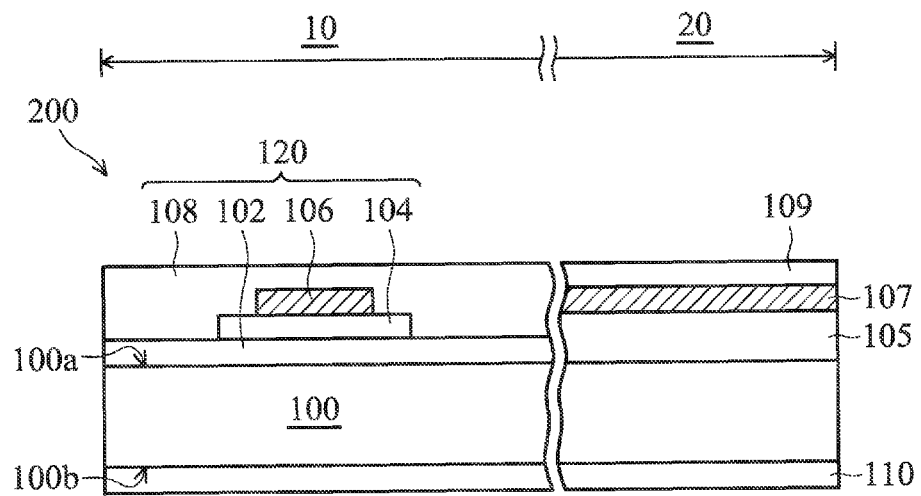
Figure 2A:
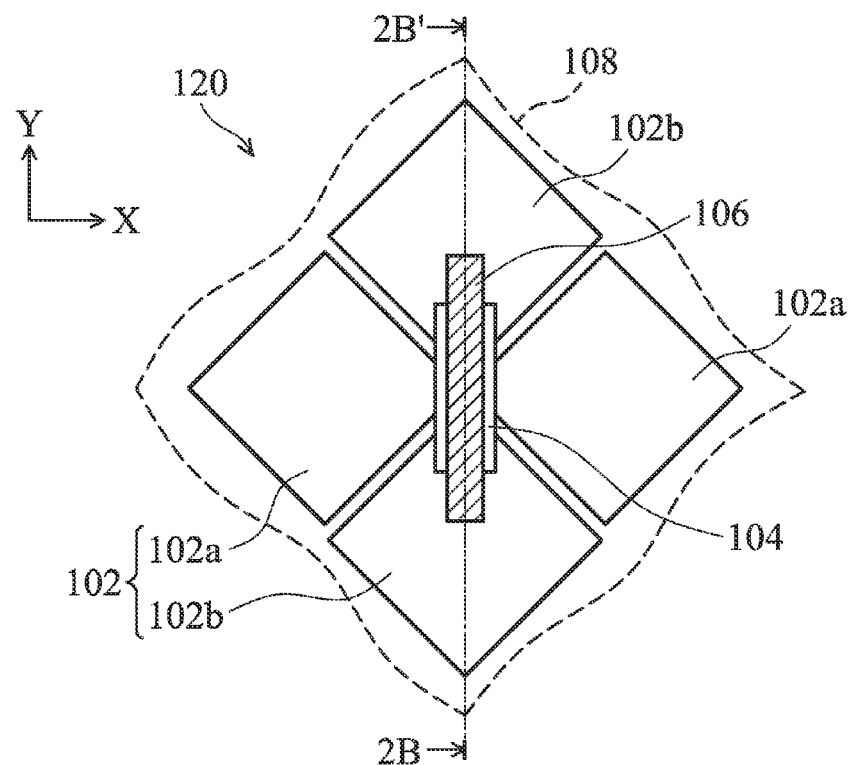
FIG. 2A is a plan view of an exemplary embodiment of the sensing layer shown in FIG. 1D.
Figure 2B:
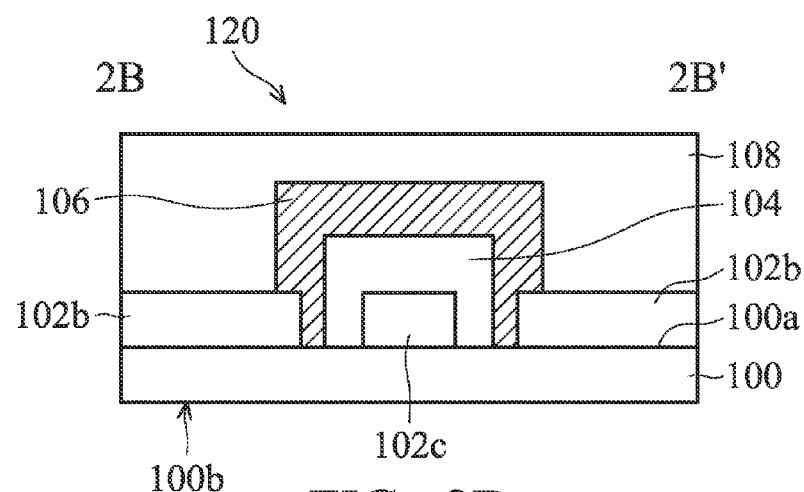
FIG. 2B is a cross section view along the line 2B-2B' shown in FIG. 2A.

Referring to FIGS. 2A and 2B, in which FIG. 2A illustrates a plan view of an exemplary embodiment of the sensing layer shown in FIG. 1D and FIG. 2B illustrates a cross section view along the line 2B-2B' shown in FIG. 2A. Elements in FIGS. 2A and 2B that are the same as those in FIG. 1D are labeled with the same reference numbers as in FIG. 1D and are not described again for brevity. In the embodiment, the sensing layer 120 comprises a sensing electrode array 102, an isolation layer 104, a wiring layer 106 and a second protective layer 108. The sensing electrode array 102 is disposed on the first surface 100*a* of the transparent substrate 100, and comprises a group of first sensing electrodes 102*a* in an interlaced arrangement with a group of second sensing electrodes 102*b*. Each of the first sensing electrodes of the group of first sensing electrodes 102*a* is electrically connected together along a first axial direction X by an electrical connection portion 102*c*. The isolation layer 104 covers the electrical connection portion 102*c* of the group of first sensing electrodes 102*a* that is in the first axial direction X. The wiring layer 106 is disposed on the isolation layer 104 and is electrically connected to each of the second sensing electrodes of the group of second sensing electrodes 102*b* along a second axial direction Y. The second protective layer 108 covers the sensing electrode array 102, the isolation layer 104, and the wiring layer 106.

Figure 3A:
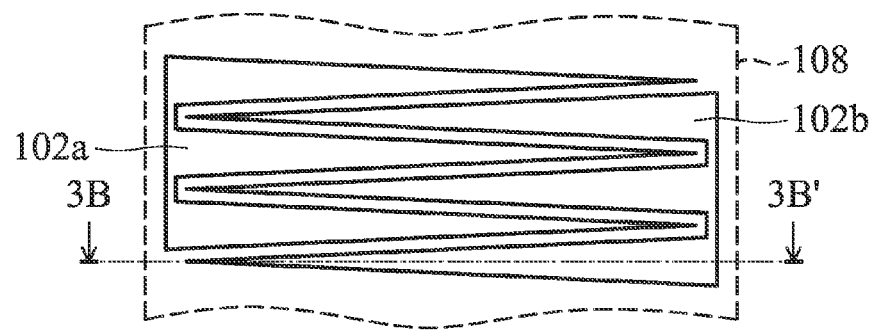
FIG. 3A is a plan view of another exemplary embodiment of the sensing layer shown in FIG. 1D.
Figure 3B:
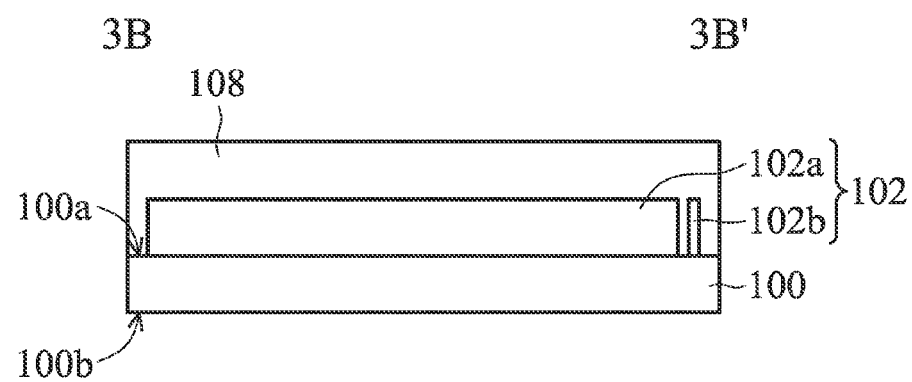
FIG. 3B is a cross section view along the line 3B-3B' shown in FIG. 3A.

Referring to FIGS. 3A and 3B, in which FIG. 3A illustrates a plan view of another exemplary embodiment of the sensing layer shown in FIG. 1D and FIG. 3B illustrates a cross section view along the line 3B-3B' shown in FIG. 3A. Elements in FIGS. 3A and 3B that are the same as those in FIG. 1D are labeled with the same reference numbers as in FIG. 1D and are not described again for brevity. In the embodiment, the sensing layer 120 comprises a sensing electrode array 102 and a second protective layer 108. Unlike the sensing layer 120 shown in FIGS. 2A and 2B, the sensing electrode array 102 disposed on the first surface 100*a* of the transparent substrate 100 comprises a group of first sensing electrodes 102a in an alternate arrangement with a group of second sensing electrodes 102b, wherein each of the first sensing electrodes of the group of first sensing electrodes 102a is electrically connected together and each of the second sensing electrodes of the group of second sensing electrodes 102b are electrically connected together, respectively, along the same axial direction. Moreover, the second protective layer 108 covers the sensing electrode array 102.

Again, referring to FIG. 1D, in the embodiment, the touch sensor device 200 further comprises an antireflection coating (ARC) layer 110 that is optionally disposed on the second surface 100b (i.e., the viewed surface) of the transparent substrate 100 and corresponds to the sensing region 10 and the non-sensing region 20 for serving as a fourth portion of the decorative film. The ARC layer 110 may enhance the transmission of the transparent substrate 100 to enhance the reflection of the reflective layer 107, thereby increasing the metallic gloss of the decorative film. In one embodiment, the first protective layer 109, the second protective layer 108 and the ARC layer 110 may be composed of the same inorganic dielectric material and be a single layer (e.g., a silicon oxide layer) or a multi-layered structure (e.g., a stack of silicon oxide).

FIGS. 1A to 1D illustrate cross section views of an exemplary embodiment of a method of manufacturing a system for displaying images having a touch sensor device according to the disclosure. Referring to FIG. 1A, a transparent substrate 100, such as a glass substrate, is provided to serve as a sensing glass or a cover glass. In another embodiment, the transparent substrate 100 may comprise quartz or plastic or non-plastic polymer transparent materials. The transparent substrate 100 has a sensing region 10 and a non-sensing region 20. Moreover, the transparent substrate 100 has a first surface 100a (i.e., non-viewed surface) and a second surface 100b (i.e., viewed surface) opposite to the first surface 100a.

Next, a black matrix (BM) pattern layer (not shown) is formed on the first surface 100a of the transparent substrate 100 and corresponds to the sensing region 10 and the non-sensing region 20. Thereafter, a sensing electrode array 102 is formed on the first surface 100a of the transparent substrate 100 and corresponds to the sensing region 10. The sensing electrode array 102 may be formed by patterning of a transparent conductive layer (e.g., an ITO or IZO layer) using lithography and etching processes. Here, in order to simplify the diagram, only a flat layer is depicted. In one embodiment, the sensing electrode array 102 may comprise a group of first sensing electrodes 102a in an interlaced arrangement with a group of second sensing electrodes 102b. Each of the first sensing electrodes of the group of first sensing electrodes 102a is electrically connected together along a first axial direction X, as shown in FIGS. 2A and 2B.

Referring to FIG. 1B, an isolation layer 104 and a color transparent layer 105 are formed on the first surface 100a of the transparent substrate 100, in which the isolation layer 104 corresponds to the sensing region 10 and the color transparent layer 105 corresponds to the non-sensing region 20. In one embodiment, the isolation layer 104 and the color transparent layer 105 may comprise a dielectric material and be a single layer (e.g., a silicon oxide layer, a silicon nitride layer or other transparent polymer layer) or a multi-layered structure (e.g., a stack of silicon oxide, silicon nitride, or other transparent polymer or a combination thereof). In this case, a dielectric material layer (not shown) is formed by a conventional deposition process, such as chemical vapor deposition (CVD) process, and then the dielectric material layer is patterned by a conventional lithography and etching process, to respectively form the isolation layer 104 in the sensing region 10 and form the color transparent layer 105 in the non-sensing region 20, in which the color transparent layer 105 has a thickness which is adjusted to be within a range from 20 nm to 90 nm. The color transparent layer 105 may present a desired color by varying the thickness of the color transparent layer 105.

In another embodiment, after formation of the isolation layer 104, a color transparent layer 105 composed of ink is formed in the non-sensing region 20 by a conventional screen printing process. In this case, the color transparent layer 105 may comprise ink composed of a transparent resin and at least one staining agent, wherein the staining agent has a percentage by weight in a range from 1% to 10%. In this case, the color transparent layer 105 may present a desired color by using various staining agents.

In yet another embodiment, the isolation layer 104 formed in the sensing region 10 covers an electrical connection portion 102c of the group of first sensing electrodes 102a that is in a first axial direction X, as shown in FIG. 2A and FIG. 2B.

Referring to FIG. 1C, a wiring layer 106 is formed on the isolation layer 104 in the sensing region 10 and is electrically connected to the sensing electrode array 102 under the isolation layer 104 (not shown). In one embodiment, the wiring layer 106 is electrically connected to each of the second sensing electrodes of the group of second sensing electrodes 102b, such that each of the second sensing electrodes of the group of second sensing electrodes 102b is electrically connected together along a second axial direction Y, as shown in FIG. 2A and FIG. 2B.

Moreover, a reflective layer 107 is formed on the color transparent layer 105 in the non-sensing region 20. In one embodiment, the wiring layer 106 and the reflective layer 107 may comprise the same metal and be a single metal (e.g., aluminum, chromium, tin, zirconium or an alloy thereof or a combination thereof) layer or a multi-layered structure (e.g., a stack of aluminum, chromium, tin, zirconium or an alloy thereof or a combination thereof). In this case, a metal layer (not shown) is formed by a conventional deposition process, such as physical vapor deposition (PVD) process, and then the metal layer is patterned by a conventional lithography and etching process, to respectively form the wiring layer 106 in the sensing region 10 and form the reflective layer 107 in the non-sensing region 20, in which the wiring layer 106 and the reflective layer 107 have a thickness in a range from 15 nm to 100 nm.

In another embodiment, before or after formation of the wiring layer 106 composed of metal, a non-conductive discontinuous phase of a metal layer is formed in the non-sensing region 20 by non-conductive vacuum metallization (NCVM), to serve as the reflective layer 107.

Referring to FIG. 1D, a first protective layer 109 is formed on the color transparent layer 105 in the non-sensing region 20 and covers the reflective layer 107. Moreover, a second protective layer 108 is formed on the isolation layer 104 in the sensing region 10 and covers the sensing electrode array 102, the isolation layer 104, and the wiring layer 106.

In one embodiment, the first protective layer 109 and the second protective layer 108 may comprise the same inorganic dielectric materials and be a single layer (e.g., a silicon oxide layer, a silicon nitride layer or a silicon oxynitride layer) or a multi-layered structure (e.g., a stack of silicon oxide, silicon nitride, or silicon oxynitride or a combination thereof). In this case, an inorganic dielectric material layer (not shown) is formed by a conventional deposition process, such as CVD process, to serve as the first protective layer 109 and the second protective layer 108. Additionally, during or after formation of the first protective layer 109 and the second protective layer 108, an ARC layer 110 is formed on the second surface 100b of the transparent substrate 100. In one embodiment, the first protective layer 109, the second protective layer 108, and the ARC layer 110 are formed by simultaneously forming an inorganic dielectric material layer on the first and second surfaces 100a and 100b of the transparent substrate 100, and may be a single layer (e.g., a silicon oxide layer) or a multi-layered structure (e.g., a stack of silicon oxide).

In another embodiment, after formation of a first protective layer 109 composed of an inorganic dielectric material, a second protective layer 108 composed of ink is formed on the reflective layer 107 in the non-sensing region 20 by a conventional screen printing process. In this case, the second protective layer 108 may comprise ink composed of a transparent resin and at least one staining agent and has a thickness in a range from 3 µm to 12 µm.

In yet another embodiment, the first protective layer 109 may comprise ink including an organic resist material, an inorganic dielectric material or a transparent resin, and the second protective layer 108 may comprise an organic resist or inorganic dielectric material.

According to the aforementioned embodiments, the color transparent layer composed of ink in the decorative film does not contain any metal particles. Compared to the decorative film formed of the conventional metallic printing ink, the decorative film of the embodiments is not limited by the size of the metal particles, and therefore the manufacturing cost for decorative films can be reduced and application to larger areas may be considered. Moreover, since the decorative film can present a metallic gloss by the reflective film, the decorative film has the same function as the decorative film formed of metallic printing ink. Additionally, since the color transparent layer, the reflective layer, and the protective layers of the decorative films can use the same materials for respectively forming the isolation layer, the wiring layer, and the protective layers in the touch sensor device, the process for formation of the decorative film can be integrated with the process for fabrication of the touch sensor device, thereby simplifying the process for fabrication of the touch sensor device.

Figure 4:
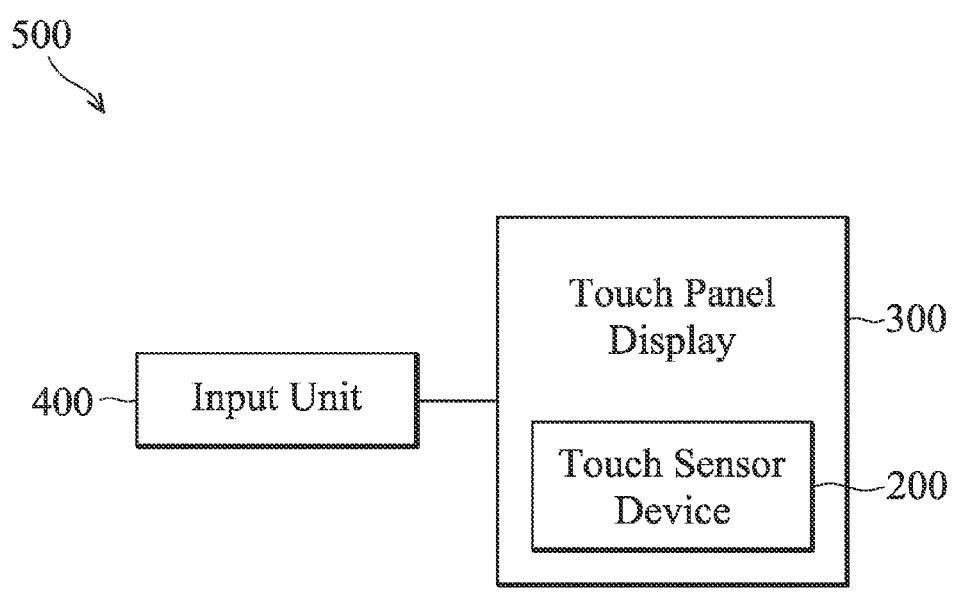
FIG. 4 schematically shows another embodiment of a system for displaying images.

FIG. 4 schematically shows another embodiment of a system for displaying images which, in this case, is implemented as a touch panel display 300 or an electronic device 500 such as a tablet personal computer, a projector, an electronic book, a laptop computer, a mobile phone, a digital camera, a personal digital assistant (PDA), a desktop computer, a television, a car display or a portable DVD player. The described touch sensor device 200 can be incorporated into the touch panel display 300. In some embodiments, the touch sensor device 200 can be incorporated into the electronic device 500. As shown in FIG. 4, the electronic device 500 comprises the touch panel display 300 and an input unit 400. Moreover, the input unit 400 is coupled to the touch panel display 300 and is operative to provide input signals (e.g. image signals) to the touch panel display 300 to generate images.

While the disclosure has been described by way of example and in terms of preferred embodiment, it is to be understood that the disclosure is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A touch sensor device, comprising:
   a transparent substrate having a sensing region and a non-sensing region and having a first surface and a second surface opposite thereto;
   a sensing layer directly disposed on the first surface of the transparent substrate and corresponding to the sensing region;
   a color transparent layer on the first surface of the transparent substrate and corresponding to the non-sensing region;
   a reflective layer disposed on and covering the color transparent layer only in the non-sensing region; and
   a first protective layer disposed on the color transparent layer and covering the reflective layer.

2. The touch sensor device as claimed in claim 1, wherein the sensing layer comprises:
   a sensing electrode array on the first surface of the transparent substrate, comprising a group of first sensing electrodes in an interlaced arrangement with a group of second sensing electrodes, wherein each of the first sensing electrodes of the group of first sensing electrodes is electrically connected together along a first axial direction;
   an isolation layer covering an electrical connection portion of the group of first sensing electrodes that is in the first axial direction;
   a wiring layer disposed on the isolation layer and electrically connected to each of the second sensing electrodes of the group of second sensing electrodes along a second axial direction; and
   a second protective layer covering the sensing electrode array, the isolation layer and the wiring layer.

3. The touch sensor device of claim 2, wherein the isolation layer and the color transparent layer comprise the same dielectric material.

4. The touch sensor device of claim 2, wherein the reflective layer and the wiring layer comprise the same metal layer.

5. The touch sensor device of claim 2, wherein the reflective layer is a discontinuous phase of a metal layer and the wiring layer is a metal layer.

6. The touch sensor device of claim 2, wherein the first protective layer comprises ink including an organic resist material, an inorganic dielectric material or a transparent resin, and the second protective layer comprises an inorganic dielectric or organic resist material.

7. The touch sensor device of claim 2, wherein the first and second protective layers comprise the same inorganic dielectric layer.

8. The touch sensor device of claim 2, wherein the touch sensor device further comprises an antireflection coating layer on the second surface of the transparent substrate.

9. The touch sensor device as claimed in claim 1, wherein the sensing layer comprises:
   a sensing electrode array on the first surface of the transparent substrate, comprising a group of first sensing electrodes in an alternate arrangement with a group of second sensing electrodes; and
   a second protective layer covering the sensing electrode array.

10. The touch sensor device of claim 1, wherein the color transparent layer comprises ink including a transparent resin and at least one staining agent, wherein the staining agent has a percentage by weight in a range from 1% to 10%.

11. The touch sensor device of claim 2, wherein the touch sensor device further comprises an antireflection coating layer on the second surface of the transparent substrate.

12. The touch sensor device of claim 11, wherein the first protective layer, the second protective layer, and the antireflection coating layer comprise the same material.

13. The touch sensor device of claim 1, further comprising a touch panel display comprising the touch sensor device.

14. The touch sensor device of claim 13, further comprising a touch panel display, wherein the touch sensor device comprises a tablet personal computer, a projector, an electronic book, a laptop computer, a mobile phone, a digital camera, a PDA, a desktop computer, a television, a car display or a portable DVD player.

15. A method of manufacturing a touch sensor device comprising:
providing a transparent substrate having a sensing region and a non-sensing region and having a first surface and a second surface opposite thereto;
forming a sensing electrode array directly on the first surface of the transparent substrate, wherein the sensing electrode array corresponds to the sensing region;
forming a color transparent layer on the first surface of the transparent substrate, wherein the color transparent layer corresponds to the non-sensing region; and
forming a reflective layer on the color transparent layer only in the non-sensing region.

16. The method of claim 15, wherein the sensing electrode array comprises a group of first sensing electrodes in an interlaced arrangement with a group of second sensing electrodes, and each of the first sensing electrodes of the group of first sensing electrodes is electrically connected together along a first axial direction.

17. The method of claim 16, further comprising:
forming an isolation layer in the sensing region and covering an electrical connection portion of the group of first sensing electrodes along the first axial direction; and
forming a wiring layer on the isolation layer and electrically connected to the group of second sensing electrodes, such that each of the second sensing electrodes of the group of second sensing electrodes is electrically connected together along a second axial direction.

18. The method of claim 17, further comprising:
forming a first protective layer on the color transparent layer and covering the reflective layer; and
forming a second protective layer to cover the sensing electrode array, the isolation layer, and the wiring layer.

19. The method of claim 18, wherein the first protective layer comprises ink including an organic resist material, an inorganic dielectric material or a transparent resin, and the second protective layer comprises an organic resist or inorganic dielectric material.

20. The method of claim 18, wherein the first and second protective layers are formed by depositing of the same inorganic dielectric layer.

21. The method of claim 18, further comprising forming an antireflection coating layer on the second surface of the transparent substrate, wherein the first and second protective layers and the antireflection coating layer are formed by simultaneously depositing the same material layer on the first and second surfaces of the transparent substrate.

22. The method of claim 17, wherein the isolation layer and the color transparent layer are formed by depositing of the same dielectric layer.

23. The method of claim 17, wherein the step of forming the reflective layer and the wiring layer comprises patterning of the same metal layer.

24. The method of claim 17, wherein the reflective layer is a discontinuous phase of a metal layer and the wiring layer is a metal layer.

25. The method of claim 15, wherein the color transparent layer comprises ink composed of a transparent resin and at least one staining agent, wherein the staining agent has a percentage by weight in a range from 1% to 10%.

26. The method of claim 15, further comprising forming an antireflection coating layer on the second surface of the transparent substrate.

* * * * *